Oct. 9, 1962 W. HEER 3,057,234
VERTICAL LATHE
Original Filed Feb. 10, 1954 3 Sheets-Sheet 2

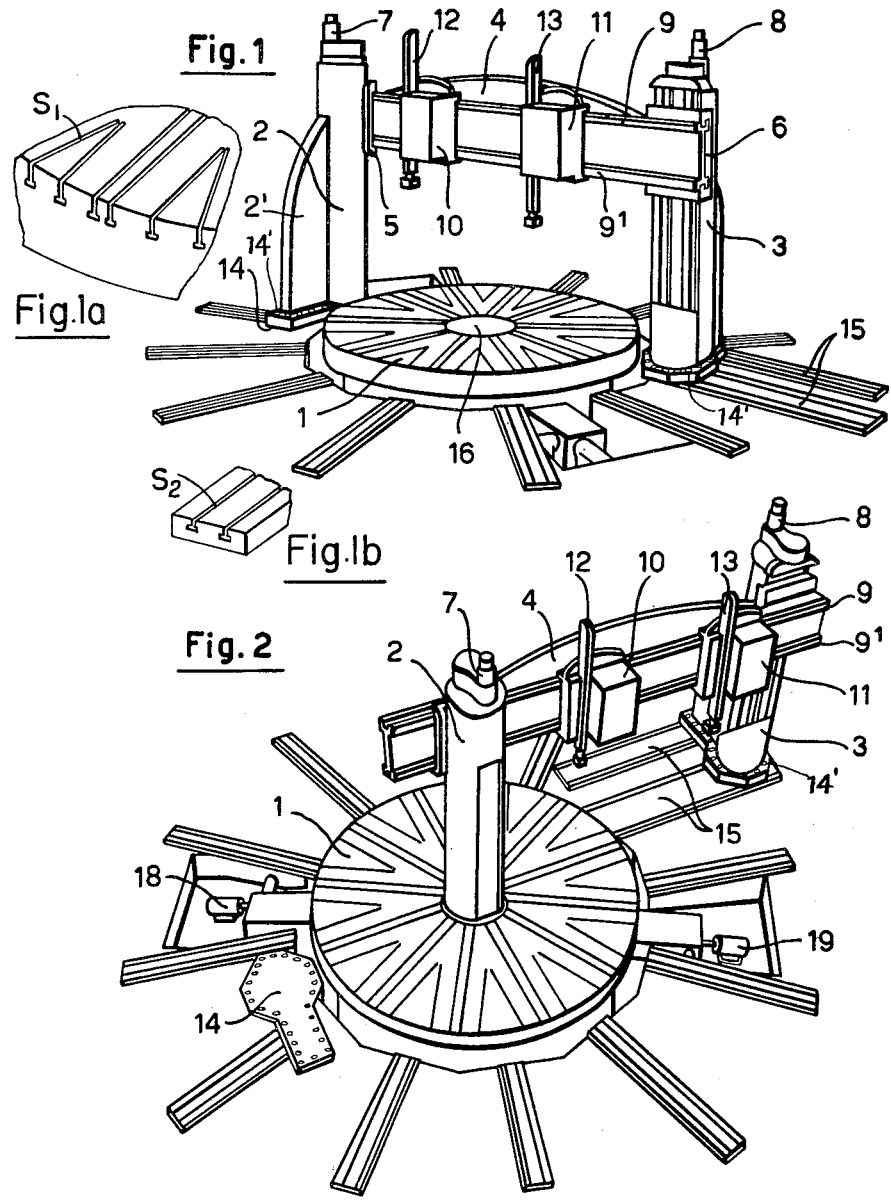

INVENTOR
Walter Heer

By Dodge and Sons
Attorneys

Oct. 9, 1962 W. HEER 3,057,234
VERTICAL LATHE
Original Filed Feb. 10, 1954 3 Sheets-Sheet 3

INVENTOR
Walter Heer

By Dodge and Son
Attorneys

_United States Patent Office_ 3,057,234
Patented Oct. 9, 1962

3,057,234
VERTICAL LATHE
Walter Heer, Zurich, Switzerland, assignor to Escher Wyss Aktiengesellschaft, Zurich, Switzerland, a corporation of Switzerland
Continuation of abandoned application Ser. No. 409,429, Feb. 10, 1954. This application May 10, 1961, Ser. No. 109,076
Claims priority, application Switzerland Feb. 23, 1953
6 Claims. (Cl. 82—2)

This invention relates to a vertical lathe which comprises a face plate, two standards and an associated cross rail with slide guide tracks.

This application is a continuation of applicant's copending application Serial No. 409,429, filed February 10, 1954, now abandoned.

In accordance with known constructions of such vertical lathes, the two standards are arranged externally of the face plate, a portal being formed over the entire face plate by the standards and the cross rail.

When such lathes have to be constructed for machining large workpieces, the standards are spaced far apart and the cross rail is given a large span. In order to avoid impermissible deformations of the cross rail, this must be of exceptionally strong construction. The expense of such a lathe is therefore comparatively high.

Such expense is all the more important, in that it frequently happens that not always workpieces of the largest possible diameter are machined and the lathe may thus in certain circumstances not be always fully utilized.

The invention has for its object to provide a vertical lathe in which the aforementioned disadvantages are avoided and which is capable of being readily adapted to all kinds of different requirements. In order to achieve this object, according to the invention, a vertical lathe which comprises a face plate, two standards and an associated cross rail with slide guide tracks, is constructed in such manner that it is possible at will to form a portal over the entire face plate or only over half the face plate by means of the cross rail and the standards.

One constructional example of the arrangement according to the invention is illustrated in simplified form in the accompanying drawings, wherein:

FIG. 1 is a perspective view of such a lathe, a portal being formed by the supports and the cross rail over the whole face plate.

FIG. 1a is a fragmentary view on an enlarged scale, showing the form of the T-slots in the face plate.

FIG. 1b is a similar view showing the form of the T-slots in the externally-formed portions of the base.

FIG. 2 shows the same lathe in which, however, the supports and the cross rail form a portal over half the face plate.

Figure 3:
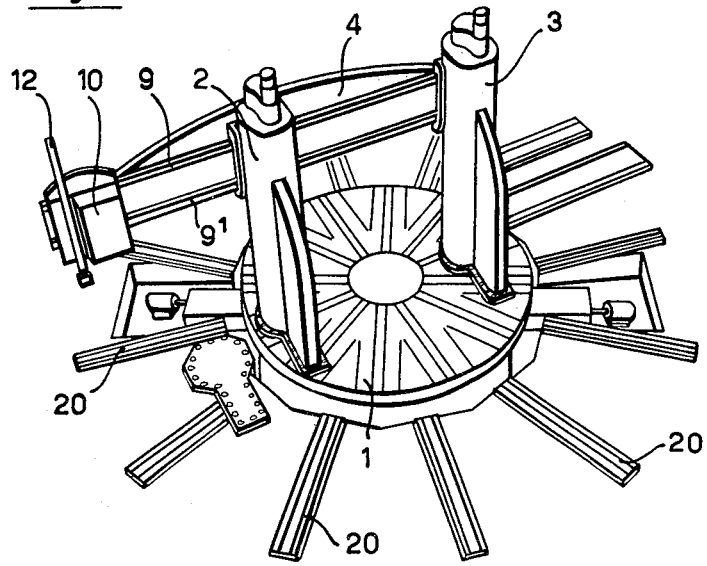
FIG. 3 shows another possibility of the arrangement of the separate parts of the lathe shown in FIGS. 1 and 2.

The vertical lathe shown in FIG. 1 comprises a face plate 1 having a central hole and rotatable about a vertical axis, two standards 2 and 3 and an associated cross rail 4. Face plate 1 includes T-slots $S_1$ formed in its upper face, by means of which the workpiece may be fastened thereto in the conventional way. Similar T-slots $S_2$ are formed in the externally-formed portion of the base such as 14 and 15 (FIGS. 1 and 2) and 20 (FIG. 3). The two standards are connected to the cross rail by way of two connecting carriages 5 and 6. These connecting carriages may be raised or lowered vertically by lifting mechanisms 7 and 8, respectively, on the standards.

The standard 2 is secured to the front side of the cross rail, while the standard 3 is secured to the rear side of the latter. The cross rail is, however, so constructed that the standards can be selectively secured to the front or rear sides of the cross rail. This amounts to saying that means for securing the standards are provided on both the front side and the rear side of the cross rail.

The cross rail is provided on its front side with slide guide tracks 9 and $9^1$, which are so constructed that the standards may be secured by way of the connecting carriages to the slide guide tracks over the full length of the cross rail and on the front face of the latter.

10 and 11 represent the ram slides (or tool carriages) shiftable longitudinally of the slide guide tracks, and 12 and 13 are the respective associated rams which carry the machining tools.

The standards 2 and 3 are secured, by means of appropriate fasteners conventionally indicated at 14', to fixed base plates 14 and 15 externally of the face plate, such plates being arranged at intervals around the periphery of the face plate 1, as shown.

Figure 4:
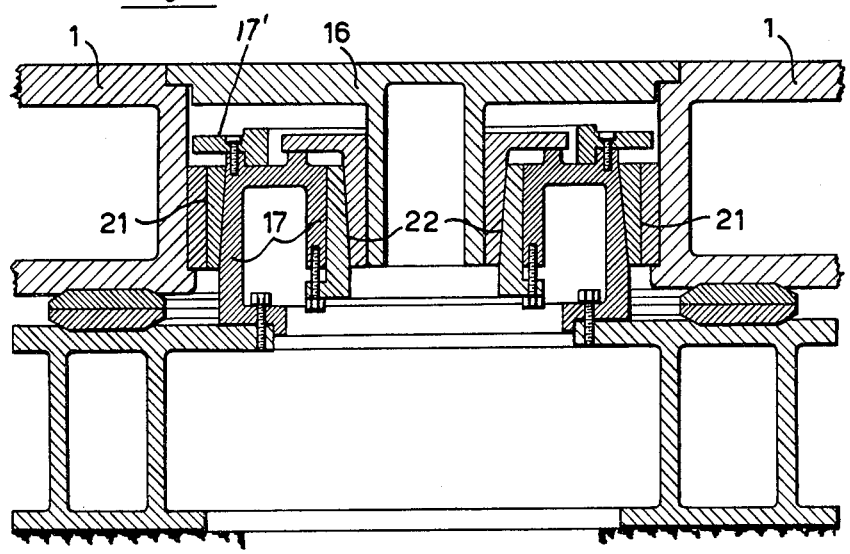
FIG. 4 is an axial section through the central bearing of the lathe.

A fixed bearing block 17 which is not shown in FIG. 1 is fitted in the middle of the face plate beneath a centering disc 16, said block being shown in section in FIG. 4.

FIG. 2 shows another arrangement of the lathe consisting of the same elements. The corresponding parts are again given the same reference numerals. The standard 2 (its laterally projecting web 2' having been removed as shown) is now arranged in the center of the face plate. The web 2' is fastened to the standard 2 by any appropriate means, not shown. The fixed bearing block serves in this case as a base plate for securing the said standard. The standard 3 is now secured on the fixed base plate 15 which has been displaced outwardly.

By means of the standards 2 and 3 and the cross rail 4, a portal is now formed over half the face plate. The cross rail has approximately the same span as in the arrangement according to FIG. 1. With this arrangement, however, it is possible to machine a workpiece of approximately twice the diameter. FIG. 2 also shows driving motors 18 and 19 by which the face plate is driven by appropriate gearing not shown in this figure.

The arrangement according to FIG. 1 corresponds to the previously known constructions. By means of the lathe being constructed in accordance with the invention, however, the result is now attained that it is also possible to machine workpieces of double the diameter with the same elements without increasing the expense. The face plate may be increased in size by supplementary elements.

The construction according to the invention has, however, the further advantage that the space of a large lathe is not required when machining relatively small workpieces and thus, when choosing the arrangement according to FIG. 1, there still remains space which can be utilized for other purposes.

FIG. 3 shows a further possible arrangement of the elements of the lathe shown in FIGS. 1 and 2. In this case, the standards 2 and 3 are fixed to the face plate 1 and the cross rail is connected to the standards so as to project at one end, the connection being by way of the connecting carriages on the slide tracks. The ram slide 10 with ram 12 and tool run on the guide tracks 9 and 9¹ at the projecting end.

With this arrangement, the workpiece is clamped on base plates 20 disposed externally. The tool is moved during the machining.

FIG. 4 represents a section through the central bearing. The fixed bearing block 17 carries an outer bearing with a slide surface 21 and an inner bearing with a conical slide surface 22. These bearings serve to center the face plate. The annular portion 17' of the bearing 17 receives and serves to center the standard 2, when located as shown in FIG. 2.

Figure 6:
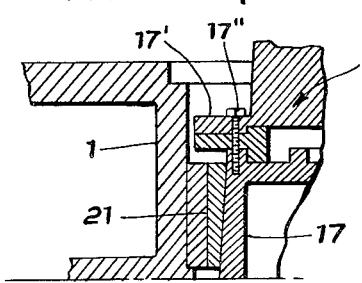
FIG. 6 is a fragmentary view showing the mounting of the central standard in the portal arrangement illustrated in FIG. 2.

The face plate 1 is centered in the inner bearing by means of the centering disc 16. When the lathe is used in the arrangement according to FIG. 1 or in that according to FIG. 3, the disc 16 is fitted. With the arrangement according to FIG. 2, on the contrary, the disc 16 is removed and the standard 2 is then fixed on the bearing block 17 by appropriate fastening means 17", see FIG. 6. The face plate 1 is then only centered by the outer bearing 21.

With the construction of a vertical lathe according to the invention, the two lifting mehcanisms which provide for the vertical displacement of the cross rail are expediently interconnected without mechanical connecting shafts. This may be easily accomplished by using synchronous motors to raise and lower the connecting carriages 5, 6, and connecting the motors electrically. By this means, there is obtained a simplification of the assembly when changing over from one to another of the arrangements of the standards which have been described.

In a similar manner, it is expedient also to dispense with a mechanical operative connection between the face plate and the drive members for feeding the ram and ram slides and the arrangement is such that the face plate is in operative connection with the drive members only through a similar electrical connection between the drive motors.

Figure 5:
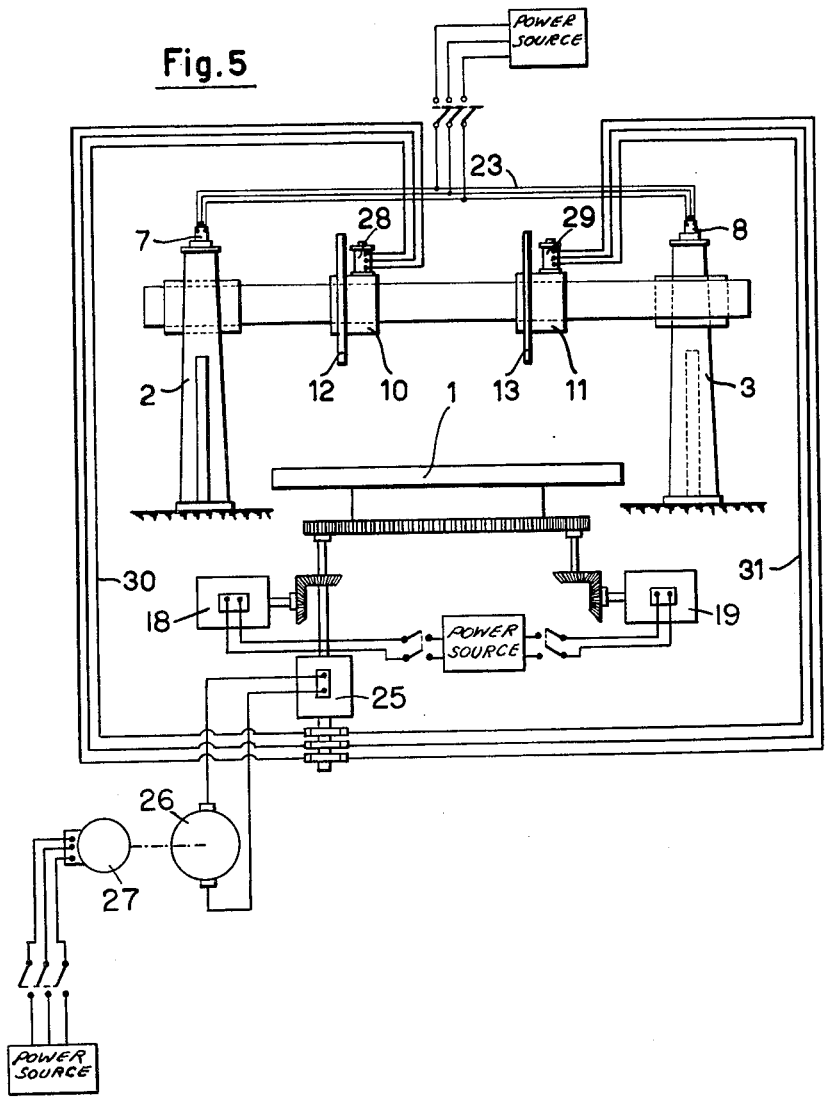
FIG. 5 is a circuit diagram showing the drive of the separate elements.

Such a circuit arrangement is shown in FIG. 5 in simplified form, in which once again the corresponding parts are given the same reference numerals as in FIGS. 1 to 3.

The motors of the two lifting mechanisms 7 and 8 arranged on the standards 2 and 3 are electrically interconnected as indicated by the lines 23. A uniform lifting movement of the two connecting elements supporting the cross rail is thus assured.

FIG. 5 also shows driving motors 18 and 19 by which the face plate 1 is driven through a gearing. The face plate 1 is also connected through gearing to a three-phase generator 25 which consequently positively rotates with the table. The three-phase generator 25 draws its field-energizing current from a D.C. generator 26 which is driven by a three-phase motor 27.

28 and 29 indicate two further three-phase current motors which serve to drive the ram slides 10 and 11 and the associated rams 12 and 13, respectively. These motors are fed with three-phase current from the generator 25 through lines 30 and 31, respectively, so that they rotate at a fixed speed ratio to the face plate 1, when the motors 28 and 29 are synchronous motors. Instead of the latter, however, it is also possible to use a synchronous motors. With the latter, at least a substantially fixed speed ratio to the face plate is obtained, since the speed of asynchronous motors is only dependent to an unimportant degree upon the load.

With the arrangement which has been described, therefore, the face plate has only an electrical connection to the driving members for the feed or rams and ram slides.

What is claimed is:

1. A vertical-axis lathe comprising in combination, supporting means; bearing means mounted on said supporting means and defining a vertical axis of rotation; a face plate rotatably mounted in said bearing means and having a central opening through which a portion of said supporting means is exposed; a sub-assembly comprising two standards, a connecting carriage mounted on each standard by means of coacting guides and guideways, a cross-member extending between said connecting carriages, and connected thereto by guides and guideways, the guides on the cross-member extending longitudinally the full length thereof, said guides and guideways affording adjustment of the elevation of the cross-member and of the spacing between the standards; at least one tool carriage having guideways therein coacting with the guides on said cross-member, said standards being selectively connected with said supporting means in different positions, namely a first position in which the cross-member straddles the entire face plate, and a second position in which said cross-member extends outward from a standard on that portion of the supporting means exposed by the central opening in the face plate to a second standard on a portion of said supporting means outside the periphery of the face plate; first connecting means including portions carried on the standards and portions carried on the supporting means outside the periphery of the face plate whereby said standards are secured in said first position; and second connecting means including portions carried on said standards and portions carried on the portion of the supporting means exposed by said central opening whereby said standards are secured in said second position.

2. The combination defined in claim 1 in which there are elevating mechanisms which respectively react between each connecting carriage and the corresponding standard and each such mechanism includes an electric motor for actuating said elevating mechanism; and circuit means are provided for operating both motors in unison.

3. The combination defined in claim 1 in which at least one end portion of the cross-member is provided, both on the front side and on the rear side, with means for securing it to the standards.

4. The combination defined in claim 1 in which the supporting means, within the central opening of the face plate, takes the form of a fixed bearing block which serves to center the face plate; said block having an inner bearing and an outer bearing, said inner bearing being adapted to receive and position a removable disc which, when in place, fills the central opening in the face plate.

5. A vertical-axis lathe comprising in combination a face plate having a central opening; supporting means on which said face plate is mounted to rotate about a vertical axis, said supporting means being exposed through the central opening of the face plate; a sub-assembly comprising two standards, a connecting carriage mounted on each standard by means of coacting guides and guideways, a cross-member extending between said connecting carriages, and connected thereto by guides and guideways, the guides on the cross-member extending longitudinally the full length thereof, said guides and guideways affording adjustment of the elevation of the cross-member and of the spacing between the standards; at least one tool carriage having guideways therein coacting with the guides on said cross-member, said standards being selectively connected in any one of three different positions, namely, a first position in which both standards are connected with the supporting means outside the periphery of the face plate, a second position in which one standard is connected with that portion of the supporting means which is exposed by the central opening in the face plate and the other standard is connected with said supporting means outside the periphery of the face plate, and a third position in which both standards are connected to the annular face plate; first connecting means including portions carried on the standards and portions carried on the supporting means outside the periphery of the face plate whereby said standards are secured in said first position; second connecting means including portions carried on said standards and portions carried on the portion of the supporting means exposed by said central opening whereby said standards are secured in said second position; and third connecting means including portions carried on said standards and portions carried on said face plate whereby the standards may be secured in said third position.

6. The combination defined in claim 5 in which the guides on the cross-member, the connecting carriages and at least one tool carriage are such that said carriages may be mounted on the cross-member in different sequences.

No references cited.